March 6, 1956 G. L. BUSH ET AL 2,737,650
ELECTROMAGNETICALLY SETTABLE INDICATOR UNIT
Filed March 13, 1953 2 Sheets-Sheet 1

*INVENTORS*
GEORGE L. BUSH
GEORGE W. DENNIS
MERTON L. HASELTON
BY
*ATTORNEY*

March 6, 1956 G. L. BUSH ET AL 2,737,650
ELECTROMAGNETICALLY SETTABLE INDICATOR UNIT
Filed March 13, 1953 2 Sheets-Sheet 2
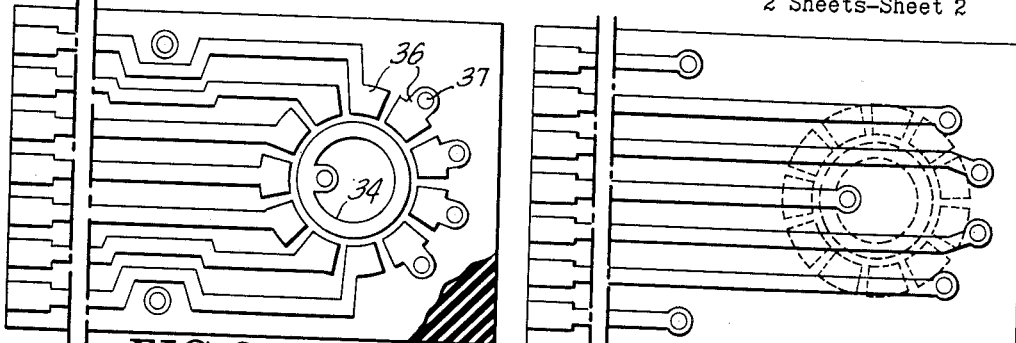
FIG. 3
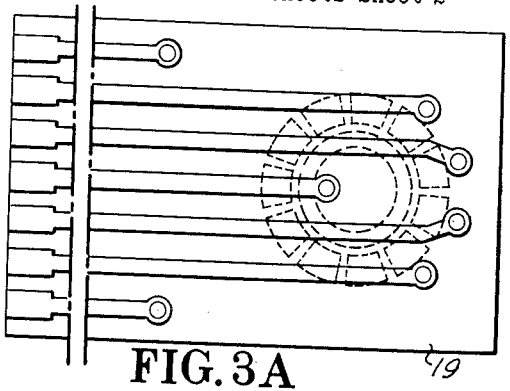
FIG. 3A
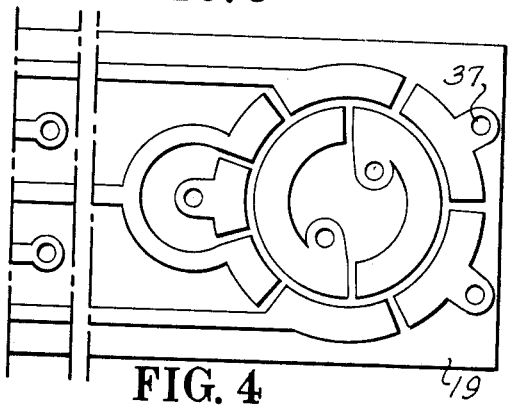
FIG. 4
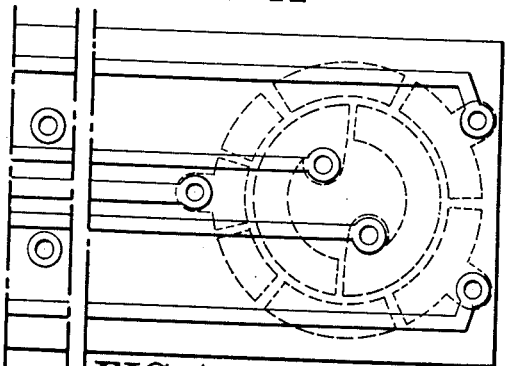
FIG. 4A
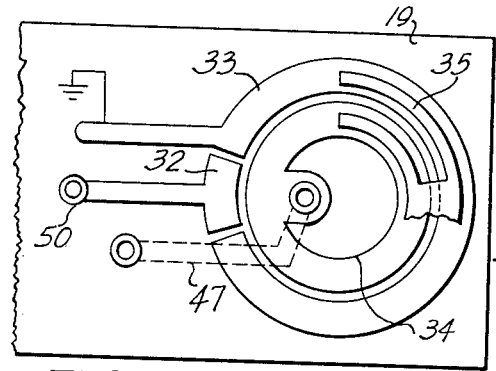
FIG. 5
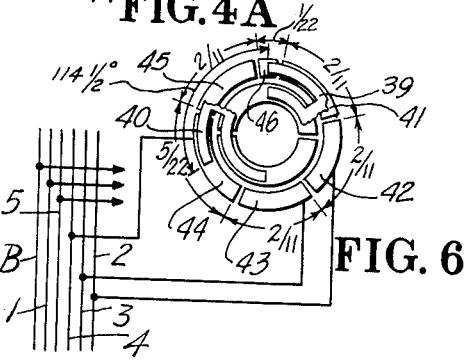
FIG. 6
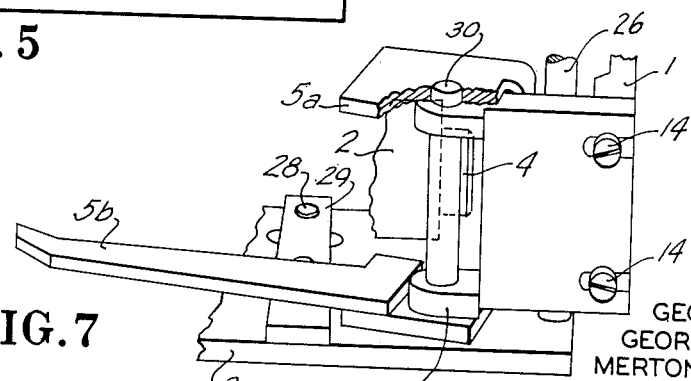
FIG. 7
INVENTORS
GEORGE L. BUSH
GEORGE W. DENNIS
MERTON L. HASELTON
BY 
ATTORNEY

United States Patent Office 2,737,650
Patented Mar. 6, 1956

2,737,650

ELECTROMAGNETICALLY SETTABLE INDICATOR UNIT

George L. Bush, Flushing, George W. Dennis, Larchmont, and Merton L. Haselton, Rye, N. Y., assignors to The Teleregister Corporation, New York, N. Y., a corporation of Delaware Application March 13, 1953, Serial No. 342,180

11 Claims. (Cl. 340—379)

This invention relates to indicator units, particularly of the revolving drum type such as are commonly used in stock quotation boards and the like. The improvements which we have incorporated into our novel indicator unit are, to a large extent, structural. They contribute not only toward reduction of the cost of fabricating such indicator units, but also toward dependability of operation under varying service conditions and toward greater durability. Furthermore, by arranging for interchangeability of different forms of printed circuits (so-called) as one of the components of our indicator unit, we have considerably widened the range of usefulness of that unit so that it can be adopted in different systems at a minimum of replacement and servicing costs.

It is a primary object of our invention to provide an indicator unit of the revolving drum type which incorporates therein facilities for interchangng one of its components, namely the printed circuit device that includes a commutator and a set of connector terminals all in one piece. Any one of several differently designed printed circuit devices may be assembled with the remaining parts of our novel indicator unit in order to meet the specific demands of the indicator panel wherein that unit may be utilized. The choice of printed circuit designs depends upon the functional requirements of the system involved.

Another object of the invention is to provide an indicator unit the design of which facilitates adjustment of its working parts to obtain optimum conditions for dependable performance; such adjustment possibilities giving the advantage of reduced cost of production, since more liberal manufacturing tolerances can be allowed in the finishing of the individual parts before assembly.

The foregoing and other objects and advantages of our invention are realized in the novel structure and in the interchangeability of the printed circuit element in a manner which may be briefly described as follows:

A frame is provided on which to mount the several working parts in adjustable relation one to another. The indicator drum has a spindle which is fixedly seated in the base of the frame and in a hole in the top-plate, the latter being the printed circuit, so-called. Actually we prefer to use a top plate of insulating material onto which metal layers have been affixed, these metal layers being etched out to form the necessary commutator segments, connector terminals and interconnecting leads between the commutator and the terminals.

The indicator drum is preferably a moulded part having at its base an escapement wheel and a ratchet wheel, these wheels, the cylindrical shell and the hub being integrally formed. A top cover supports one or two brushes which sweep over the commutator segments and associated collector ring.

The stepping magnet has its core bolted to a U-shaped pole-piece or yoke, this yoke being adjustably bolted to the frame. The armature has a pivoted mounting on a bracket which, preferably, is adjustably bolted to the frame. A non-magnetic extension arm fastened to the armature has a detent for engagement with the escapement wheel and also has a pawl for engagement with the ratchet wheel. Other parts of the unit, so far as a choice of materials is possible, are made of non-magnetic material. A stop member is adjustably mounted so as to co-operate with the armature for maintaining a suitable air-gap when the armature is attracted to the core of the magnet. A restoring spring interlinks the extension arm and an adjustable anchorage therefor. This arrangement facilitates adjustment of the spring tension.

Our invention will now be described in more detail, reference being had to the accompanying drawings in which:

Figure 3 is a bottom view and Figure 3a a top view of one form of printed or etched circuit whereon there is a commutator having eleven equal segments in the outer ring and a continuous inner collector ring;

Figure 4 is a bottom view and Figure 4a a top view of an alternatively usable printed or etched circuit wherein the commutator has outer ring segments of two different arcuate lengths and the inner ring has two semicircular segments;

Figure 5 shows diagrammatically a commutator having one segmented ring wherein a single segment subtends an arc of substantially $\frac{1}{11}$ of the circumference and the remainder of the ring is occupied by a single segment, the collector ring for a single brush being continuous;

Figure 6 shows diagrammatically still another modification of a usable comutator for code signal detection and interpretation, the outer ring segments being of three different arcuate lengths, and the inner ring being split into two semicircular portions; and Figure 7 is a perspective view in skeleton form of the principal working components of our improved indicator unit.

Figures 1, 2:
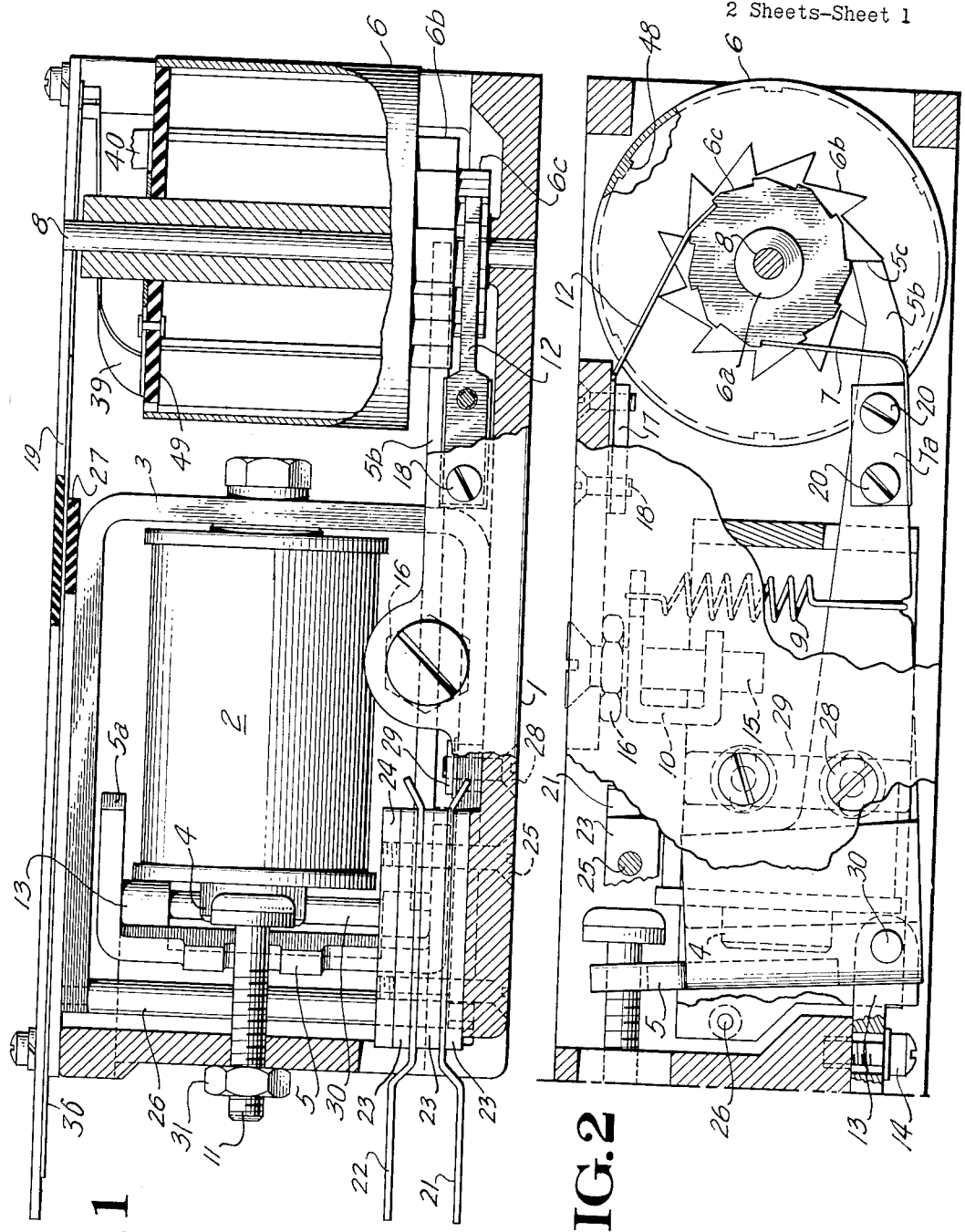
Figure 1 is a side-view elevation, partly in cross section and with portions of the frame broken away in order to expose the working parts of our improved indicator unit.
Figure 2 is a bottom view of the indicator unit, also with parts broken away to expose operating elements.

Referring first to the elevation view, Fig. 1, and to the broken-away bottom view, Fig. 2, we show therein a frame 1 which can be a metal casting or, alternatively, a punched and formed sheet-metal element. As shown in the drawing it is a casting which lends itself to more rigid mounting of the various components and the maintenance of proper interaction between them after their normal positions have been adjustably fixed.

A stepping magnet 2 has a U-shaped pole-piece 3 to which the magnetic core 4 is bolted. One arm of the pole-piece lies flat on the base and is bolted thereto by means of bolts 28 which are screwed into a retaining strap 29. Elongated holes in the pole-piece permit longitudinal adjustment of the pole-piece and its magnet with respect to the axis of the indicator drum.

The armature 5 is preferably a punched and formed part having wings 5a and an extension arm 5b. The wings carry magnetic flux to the pole-piece arms with a minimum of reluctance, since the air-gap therebetween is small and has a relatively wide area. The extension arm 5b ends in a detent 5c which co-acts with teeth of an escapement wheel 6b. The ratchet wheel 6c is engaged by a driving pawl member 7 which is preferably resilient and is fastened to the arm 5b by means of screws 20 through a wing-portion 7a of the pawl. Alternatively the pawl may itself be rigid and be pivotally mounted on the arm 5b, in which case it would require resilient means for engaging it with the teeth of the ratchet wheel 6c.

The armature has a rock-shaft 30 which is journaled in a bracket 13, the latter being adjustably fastened to the frame by means of screws 14. The adjustability is provided by enlarged or elongated holes or slots in the bracket 13 for admission of the screws. This adjustability of position of the rock-shaft 30 by shifting the anchorage of the bracket 13 is important because it facilitates positioning of the detent 5c so that when it is engaged with teeth of the escapement wheel 6b the characters on the periphery of the drum 6 will be centered in the window opening in the front plate for the indicator panel. This front plate has not been shown because it is conventional and is independent of the novel features of the invention. It is commonly made as a thin metal punching with formed tabs to be snapped onto frame posts at the vertical front corners of the indicator unit.

The adjustment of position of the magnetic yoke 3 or pole-piece, as above explained must be co-ordinated with the adjustment of position of the rock-shaft 30 so that when the armature is attracted and the detent 5c is withdrawn from the orbit of the escapement wheel 6b with suitable clearance there will exist an optimum air-gap between the armature 5 and the core 4, of substantially uniform thickness across the face of the core. Stop means comprising a frame-supported bolt 11 having a lock-nut 31 has a head the position of which can be adjusted to engage with lugs on the armature and to stop the attractive stroke of the latter before it makes contact with the core 4, thus avoiding a "sticking" effect.

The restoring spring 9 is preferably hooked onto the armature extension arm 5b at a notched edge thereof. The other end of the spring is held by a screw-threaded clip 10 which is supported by a screw 15, this screw having anchorage in the frame and being secured thereto by means of a lock-nut 16. The initial adjustment of spring tension can be obtained by screwing the clip 10 up or down before hitching the spring 9 thereto.

A detent 12 is secured to the frame by means of screws 18 and an anchor-plate 17. This detent engages with the ratchet teeth 6c at all times and resiliently so as to prevent rotation of the drum except when driven by the pawl 7 and the spring 9. The detent 5c acts to prevent "overthrow." It will be observed that the interaction between the detent 5c and the teeth of the escapement wheel 6b is such that only for a small part of the stepping cycle is the detent 5c removed from the orbit of the escapement wheel teeth 6b. As soon as the pawl driving stroke gets under way the detent drops into the next space between the teeth of the escapement wheel. So the stepping cycles can be performed with considered speed and without risk of overstepping or failure.

An important characteristic of the stepping mechanism is that it allows the indicator drum to stand motionless while the armature is being pulled up by a magnetic pulse, and a full step is given to the ratchet wheel by the spring-driven pawl upon cessation of the stepping pulse through the magnet. Most of the previously used step-actuated indicators with which we are familiar have used a stepping mechanism which has a star-wheel and an escapement pallet. Such stepping mechanisms have the drawback that the drum is turned about half way from one setting to the next during the half-cycle of the armature attraction, and reaches the indicating position only after the armature has been restored to normal by spring power. The half-cycle movements of the drum are undesirable when commutator-and-brush functions are to be performed as will be explained hereinafter.

Our novel indicator unit is adaptable to various types of indicator panels both old and new in general design. In one of the older types of indicator panels provision is made for connecting each indicator unit to the actuating circuits through connector strips and through the grounded frames. Such indicators have to be restored to a blank position before being stepped into a new indicating position. Their commutator-and-brush device is one having means for interrupting the train of restoring pulses when the indicator drum and the circuit connector which rotates with it have reached the blank position. When the indicator stands in the blank position a start pulse through a separate segment of the commutator must precede a train of counting pulses if the indicator drum is to be stepped further than the one step of response to the start pulse.

In cases where our novel indicator unit is to be used as a replacement for the older type units and in systems which operate under control of counting pulses, as explained in the preceding paragraph, we have supplied our unit with two connector terminals 21 and 22 which are arranged to fit into mating terminals on the framework of the panel. For the sake of simplicity of delineation of details in the drawings we have purposely omitted a showing of interconnections between the connector terminals, the coil of the magnet 2 and the commutator. The circuitry, however, may be considered to be equivalent to that which is shown and described in Patent 2,117,661, dated May 17, 1938, and issued to M. L. Haselton. Figs. 3, 6 and 7 of that patent illustrate how the stepping of the indicator to a desired display position can be accomplished after applying thereto a train of re-set pulses for "homing" the indicator drum to the blank position.

By way of comparison between Fig. 3 of the above cited Haselton patent and Fig. 1 of the instant application, the patent shows terminal strips 58 and 59 which correspond respectively with terminal strips 22 and 21 in our Fig. 1. Terminal 21 should be connected through an eyelet 50 to a short segment 32 on the commutator shown in our Fig. 5 and will be understood to be used for application of a start pulse. This start pulse serves to energize the magnet 2 only when the indicator drum 6 stands to show a "blank." The start pulse at this time traverses terminal 21, a connection to segment 32, brush 35, collector ring 34, a connection through a conductor 47 and the coil of magnet 2, and thence through connector terminal 22 to the applied source of counting pulses. If the setting operation is to include more than one step, then counting pulses will travel through a circuit wherein the pulse train is applied at terminal 22, goes thence to the magnet coil 2, and therefrom to collector ring 34, brush 35, commutator segment 33 and common ground which is reached via connection of segment 33 to the framework of the indicator unit and panel. In this way our novel indicator unit may be operated in the same manner as has been considered conventional when using older types of indicator units. The substitution of our new unit in place of one of the older type in existing indicator panels for stock quotation service is one application which necessitates the use of the connector terminals 21 and 22 as shown in our Fig. 1. Otherwise these terminals may be eliminated and connection would then be made through conductive terminals which comprise portions of the printed circuit 19. Plug and jack elements for this purpose may be in accordance with the showing and teachings of a co-pending application, Ser. No. 300,390, filed July 23, 1952, by Alan E. Willis, now Patent No. 2,711,523, issued June 21, 1955, and assigned to the assignee of this application. With that arrangement the ground connection for our commutator segment 33 may be made through the conductor and terminal with which it has electrical connection, as shown in Fig. 5.

Referring now to Figs. 3 and 3a we show therein an alternatively useful commutator of the printed circuit type, Fig. 3 being a bottom view and Fig. 3a a top view. This modification has eleven segments 36 in the outer ring and a closed collector ring 34 like that of Fig. 5 as above described. An equivalent brush 35 is also used to bridge any particular segment and the collector ring. This embodiment of our invention may be adopted for use in connection with an indicator transfer circuit arrangement of the type shown in a co-pending application of George L. Bush, Ser. No. 322,085 filed November 22, 1952, now Patent No. 2,727,222, issued December 13, 1955, also assigned to the assignee of the instant application. Bush shows a system in which the setting positions of the indicators may be selectively determined by the well-known seeker switch method.

According to that Bush application the stepping pulses for the indicator unit do not traverse the commutator of the printed circuit, but the later is used for relay control to interrupt the pulse train when the indicator drum has been stepped to a desired setting. In this case, therefore, the choice of any position into which the indicator drum is to make a selected character display depends on the selection of one of the eleven signaling circuits which are respecitvely connected to the several segments 36 of our commutator as shown in Fig. 3, where this commutator is similar to the one shown in Fig. 5 of said Bush application.

Our 11-segment commutator, as made a part of the printed circuit of Figs. 3 and 3a, represents an interchangeable component of the complete combination which is useful in systems wherein the indicator unit does not require re-setting pulses for stepping it to a blank position prior to the application of a pulse train for selective display setting. Instead, the maximum number of pulses is available from the pulse generator for stepping the indicator drum from any old position to a newly selected position, whereat the pulse train is interrupted and the actuating circuit is cut off by relay action. Furthermore, as explained in the cited Bush application, the system which he discloses is capable of use to transfer an indication from one to another indicator unit. He employs a multi-conductor bus line to interconnect corresponding segments in a multiplicity of indicator units for digits of like denomination, and such a bus line can be used either to set a selected indicator unit from a primary signaling source, or to read out a signal representing the setting of an indicator the character display of which is to be copied into another indicator unit.

A feature common to the several modifications of our pirnted circuits, as we prefer to have it, is that the two sides of the insulation plate 19 carry the same number of conductors and connector terminals, or if the total number is odd, then the bottom side has one more than the top side. The reason for this is that when the connector terminals are inserted into the jack, or receptacle for which they are adapted, there is a balance of opposing pressures of the contact springs in the jack and against the two sides of the printed circuit.

The conductors on the top side of the printed circuit are necessarily connected to conductive members on the bottom side. Thus, the top-side conductors may be connected by means of eyelets 37 either with certain of the commutator segments, or the collector ring, or wires (not shown) leading to the stepping magnet coil 2.

The printed circuit modification shown in Figs. 4 and 4a is substantially the same as was disclosed in the aforementioned Bush application Ser. No. 322,085, and as Fig. 3 thereof. This printed circuit has a commutator with seven segments in an outer ring and semi-circular segments in an inner ring. Two short segments in the outer ring are interconnected. Between them is another short segment. The remaining segments of the outer ring are four in number and each spans an arc twice as great as that which is spanned by one of the short segments. The relation of lead and lag between the points of contact of the two brushes on the outer ring segments is such that for each of eleven display positions a different code comibnation is provided, so that input and output signals traversing the commutator and brushes are effective in controlling the setting mechanism selectively. Also in composing the answer-back signals, as at times needed, the brush arrangement cooperating with this commutator is likewise effective.

The printed circuit modification shown in Fig. 5 is particularly useful when our improved indicator unit is to be empolyed as a replacement component in existing inidcator panels. The commutator portion of this circuit comprises an outer ring including a short segment 32 and a long segment 33, also a full circle collector ring 34, as mentioned above when describing how this modification can be used in place of the unit of Haselton's Patent 2,117,661, and especially when such indicators are required to be restored to a blank position before being stepped by counting pulses to a new setting. This type of indicator unit has only one brush 35. Furthermore it is not adapted to deliver answer-back, or read-out signals.

In Fig. 6 we show a modified printed circuit having a novel commutator which may be used advantageously for input and output signaling purposes and where the signal code of six code elements has eleven permutations to represent the eleven selectable positions of display for the indicator.

The inner ring of this commutator has two semicircular segments 38. The wiper arms of the brushes 39 and 40 make contact with segments of the inner ring at diametrically opposed points. The brush connections to the inner ring segment are, therefore, separate and distinct at all times.

The outer ring of the commutator contains six segments 41 to 46 inclusive, which are numbered in clockwise order as viewed in Fig. 6. Segments 41, 42, 43 and 45 are of equal arcuate length, each spanning substantially $2/11$ of the circumference if the gaps between segments be disregarded. The arc substended by segment 44 is substantially $5/22$ of the circumference and that subtended by segment 46 is substantially $1/22$.

Brushes 39 and 40 have a mutual phase displacement of approximately $114\frac{1}{2}°$. They are so oriented with respect to the eleven display positions of the drum as to obtain a certain interpretive significance of the selecting code signals used for each character display. If, for example, in addition to a blank position, here designated B, the nine digits and "0" are to be displayed in their respecitve positions, and if signal potentials are applied to certain pairs of the six segments in the outer ring, the brushes traversing these segments will, at some step of the advancement of the drum, find coincidence between the pair of segments on which the brushes rest and the pair of signal conductors on which potentials are fed to these segments. The following table shows an arbitrary arrangement which would satisfy the requirements for setting the drum to any one of its display positions:

| Character Display | Brush Positions | | Code Conductors Activated |
| --- | --- | --- | --- |
| | #1 Leading | #2 Trailing | |
| B | 46 | 44 | B—4 |
| 1 | 41 | 44 | 1—4 |
| 2 | 41 | 45 | 1—5 |
| 3 | 42 | 45 | 2—5 |
| 4 | 42 | 41 | 2—1 |
| 5 | 43 | 41 | 3—1 |
| 6 | 43 | 42 | 3—2 |
| 7 | 44 | 42 | 4—2 |
| 8 | 44 | 43 | 4—3 |
| 9 | 45 | 43 | 5—3 |
| 0 | 45 | 44 | 5—4 |

In the above table the brush positions are designated by the outer ring segments on which the brushes rest for each character display position of the indicator drum. The code conductors activated are given the references B and 1 to 5 inclusive, corresponding to the units digit of the reference numbers applied to the several segments, except that signal conductor B is connected to segment 46.

The phase lead of brush #1 over brush #2 amounting to $114\frac{1}{2}°$ accounts for the fact that upon each step of advancement of the two brushes over the outer ring segments a different pair of these segments is contacted, thus facilitating the use of the code signaling conductors according to the right hand column of the table.

With respect to the commutator-and-brush arrangement shown in Fig. 6, we find that it facilitates the use of a preferred signal code wherein only five elements are permutationally paired for selection of the nine digits and "0," and the sixth code element is used only to select the blank position of the indicator.

The perspective view shown in Fig. 7 has for its purpose to show more clearly the manner of supporting the armature 5 on the rock shaft 30, which in turn is held adjustably positioned by the bracket 13, as heretofore described. Also the manner of adjustably strapping the U-shaped pole-piece 3 onto the frame 1 is shown in Fig. 7. The pole-piece has elongated holes for two screws 28, the latter being inserted in holes through the base portion of the frame and threaded into screw-holes in the strap 29. Before tightening the screws the pole-piece 3 can be moved slightly forward and backward so as to obtain its optimum setting. Then the strap 29 can be clamped down onto the top side of the pole-piece leg and tightened by means of the screws 28. These adjustments, both as respecting the position of the rock-shaft 30 and as to the positioning of the pole-piece have already been explained, particularly to show how they facilitate assembling and testing operations and add to the dependability of the unit under practical operating conditions.

With respect to the integral structure of the indicator shell and its toothed wheels, as well as its hub, already described, it should be added that when it is formed as a moulded plastic, as is preferred, then it is convenient to include ribs 48 inside the cylindrical wall of the drum. These ribs do not extend quite to the top edge of the cylindrical wall, but at their upper edges they provide seating means for a cover-disk 49 of insulating material. On this disk the brush or brushes are affixed, as by means of eyelets.

While we have shown and described our improved indicator unit as exemplified by several modifications thereof, it will be understood that other modifications may be made by those skilled in the art without departing from the spirit and scope of the invention.

We claim:

1. An electromagnetically settable indicator unit of the revolving drum type, comprising a frame, a magnet having a U-shaped pole-piece and a core attached to the latter at its heel end, a pivoted armature having a central portion facing said core and having wings closely adjacent the arms of said pole-piece, and having an extension arm which terminates in a detent, an integrally formed structure comprising an indicator shell with hub and two toothed wheels, one of said wheels presenting its teeth to said detent to be locked and unlocked thereby, and the other of said wheels having ratchet teeth to be driven, a driving pawl mounted on said extension arm and engaged with said ratchet teeth, a frame-supported axle for said hub, a spring interlinking said extension arm with an adjustably fixed anchorage and serving to normalize the position of said armature upon de-energization of said magnet, stop means adjustably settable in respect to said armature, thereby to suitably determine the air-gap between magnet core and armature when the latter is attracted, a second detent having fixed anchorage on said frame and operable to engage with teeth of said ratchet wheel and to prevent reverse turning of the same, an adjustable pivot support for the armature and a plurality of means providing adjustments of the pole piece and of the armature pivot support relative to each other, one of said adjusting means being operable when the first said detent is withdrawn from locking engagement with the associated toothed wheel for limiting the clearance therefrom.

2. An indicator unit comprising a generally rectangular frame within which are mounted a rotatable indicator drum and actuating means including an electromagnet controlled by incoming signals for stepping the drum to any of its display positions, said frame having means for mounting thereon one or another of several interchangeable plates, said plates constituting in each case the carrier of a printed or etched circuit comprising conducting strips which extend rearwardly of said indicator unit to form connector terminals, and extend forwardly to form concentric rings comprising commutator segments for establishing different control circuits through the unit respectively corresponding to different display positions of the drum, said indicator unit comprising further a brush arrangement mounted on and rotatable with said indicator drum and adapted to sweep said commutator segments, the interchangeability of said plates enabling the indicator unit to serve as a component in indicator boards of different design and having variously operable electrical control systems.

3. An indicator unit according to claim 2 and further characterized in that on said circuit as carried by one of said interchangeable plates the commutator segments are eleven in number and of equal arcuate span in an outer ring, and said brush arrangement is operable to connect said segments in single progression with an inner collector ring which is part of said circuit.

4. An indicator unit according to claim 2 and further characterized in that the commutator segments of said circuit as carried by one of said interchangeable plates consist of two semi-circular inner ring segments and six outer ring segments, those of the outer ring including one which spans an arc substantially five times greater than that spanned by another of said outer ring segments, and the four remaining segments of the outer ring subtend equal arcs each approximately equal to two-elevenths of the circumference.

5. An indicator unit according to claim 4, wherein said brush arrangement comprises leading and trailing brush elements having a phase displacement between their respective points of contact with the outer ring segments equal to substantially 114½°.

6. A commutator and brush arrangement in combination with the rotary drum of an indicator unit and setting mechanism therefor, the commutator having a segmented ring for establishing different signal control circuits through the unit respectively corresponding to different code signal combinations, said arrangement including two brushes mounted on and rotatable with said drum, and arranged to close two circuits simultaneously and permutatively according to different display settings of said drum, and said ring being divided into six segments, four of which subtend equal arcs each approximately equal to two-elevenths of the circumference, while one segment subtends a greater arc and one segment a lesser arc than the rest, whereby the progression of the two brushes in eleven equal steps, one leading the other by substantially 114½° provides eleven distinct permutational pairings of two segments on which the brushes may rest when different characters or a blank are displayed by said drum.

7. A commutator and brush arrangement according to claim 6 and including semi-circular segments of an inner commutator ring within said six-segment ring, the brushes having arms which respectively sweep said semi-circular segments at diametrically opposed contact points.

8. An indicator unit of the revolving drum type comprising electromagnetic setting mechanism to rotate the drum step-by-step, a brush device mounted on said drum, a segmented commutator having inner and outer rings the segments whereof are arranged and adapted to be swept by said brush device for selective interconnection of a segment of one of said rings and the other ring, an insulating plate for supporting said commutator, a plurality of connector terminals which collectively constitute a printed or etched circuit arrangement having individual conductors interconnecting the terminals with appropriate segments of said one of the rings for electrically connecting said setting mechanism to a source of discrete pulses for rotating the drum step-by-step selectively to different indicating positions, and other connector terminals alternatively usable in place of said printed connector terminals for electrically connecting said setting mechanism to a source of discrete pulses for rotating the drum step-by-step selectively to different indicating positions whenever the indicator unit is to be assembled in a panel having receptacles positioned to mate with said alternatively usable terminals.

9. An indicator unit according to claim 8 in which the commutator has only two segments in one of said rings, one of which subtends an arc substantially equal to one eleventh of the circumference, this one segment when electrically connected through said brush device to said other ring serving to effect utilization of an initial setting pulse whereby the drum is stepped away from a blank indicating position.

10. An indicator unit of the revolving drum type responsive to incoming code signal combinations and comprising electromagnetic setting mechanism operable to rotate the drum through a complete revolution in eleven equal steps, a commutator having a segmented outer ring and two semicircular collector segments of an inner ring, the complement of outer ring segments consisting of one segment shorter than all the others, one segment longer than all the others, and four segments of equal intermediate arcuate length, a brush device mounted on and rotatable with said drum, this device comprising a leading brush and a trailing brush, the phase angle of lead between them being substantially 114½°, a plurality of connector terminals carried by an insulating plate which also supports said commutator, these terminals being individually connected to respective ones of the commutator segments in the two rings, two additional terminals for electrical connection of said setting mechanism to a source of stepping pulses, and means conditioned by the order in which the outer ring segments of different length are arranged to be swept by the brushes, and also conditioned by the relative arcuate lengths of said segments as well as by the orientation of the resting points of the brushes on the segments after making successive steps, said means being operable to establish different signaling circuits through the inner ring segments, through the brushes and through two permutationally selected outer ring segments, where eleven variants of the code signal combinations correspond respectively with the eleven display positions of the drum.

11. An indicator unit according to claim 10 and further characterized in that the orientation of said brushes with respect to their resting points on the outer ring segments is such that only the leading brush has a resting point on the shortest segment and only the trailing brush has three resting points on the longest segment.

References Cited in the file of this patent

UNITED STATES PATENTS

| | | |
|---|---|---|
| 2,592,552 | De Florez et al. | Apr. 15, 1952 |
| 2,603,702 | Kern | July 15, 1952 |
| 2,617,870 | Kern | Nov. 11, 1952 |
| 2,649,513 | Luhn | Aug. 18, 1953 |

FOREIGN PATENTS

| | | |
|---|---|---|
| 236,261 | Great Britain | June 29, 1925 |